(12) United States Patent
Barkan et al.

(10) Patent No.: US 8,396,964 B2
(45) Date of Patent: Mar. 12, 2013

(54) COMPUTER APPLICATION ANALYSIS

(75) Inventors: Ella Barkan, Haifa (IL); Jonathan Bnayahu, Haifa (IL); Tal Drory, Haifa (IL); Amnon Ribak, Misgav (IL)

(73) Assignee: International Business Machines Corporation, Armonk, NY (US)

( * ) Notice: Subject to any disclaimer, the term of this patent is extended or adjusted under 35 U.S.C. 154(b) by 168 days.

(21) Appl. No.: 12/913,812

(22) Filed: Oct. 28, 2010

(65) Prior Publication Data

US 2011/0038542 A1 Feb. 17, 2011

Related U.S. Application Data

(63) Continuation-in-part of application No. 12/464,893, filed on May 13, 2009, now Pat. No. 8,086,730.

(51) Int. Cl.
*G06F 15/16* (2006.01)
(52) U.S. Cl. ...................................................... 709/224
(58) Field of Classification Search .......... 709/200–202, 709/224, 225
See application file for complete search history.

(56) References Cited

U.S. PATENT DOCUMENTS

| | | | | |
|---|---|---|---|---|
| 7,941,439 B1 * | 5/2011 | Lawrence et al. | ............. | 707/769 |
| 7,941,849 B2 * | 5/2011 | Ting | ................................. | 726/22 |
| 8,140,794 B2 * | 3/2012 | Prahlad et al. | ................ | 711/162 |
| 2004/0186882 A1 * | 9/2004 | Ting | ............................... | 709/202 |
| 2005/0281276 A1 | 12/2005 | West et al. | | |
| 2010/0138775 A1 * | 6/2010 | Kohen et al. | .................. | 715/781 |

OTHER PUBLICATIONS

"Cyclope Employee Surveillance Solution—Features", Employee Surveillance and Monitoring Solution, 2008. URL: http://www.amplusnet.com/products/cyclope/features.htm.
"Employee Monitoring Software", 2008. URL: http://www.computer-monitoring.com/employee_monitoring.htm.
Ghulam Ali et al., "Towards an automated multiagent system to monitor user activities against insider threat", IEEE 2008. URL: http://ieeexplore.ieee.org/Xplore/login.jsp?url=/iel5/4542558/4547627/04547660.pdf?temp=x.

* cited by examiner

*Primary Examiner* — Moustafa M Meky
(74) *Attorney, Agent, or Firm* — Daniel Kligler

(57) ABSTRACT

A method, system, and computer program product for computer application analysis are provided. The method for computer application analysis includes monitoring a computer system on which an application to be analyzed is executed and interacted with by a user of the computer system. The monitoring includes: capturing screen data of the application as displayed on a display screen of the computer system including interpreting the screen data using optical character recognition (OCR); and capturing user inputs to the application to input devices of the computer system. The method further includes analyzing the captured screen data and user inputs to generate a summary of the usage of the application.

20 Claims, 6 Drawing Sheets

COMPUTER APPLICATION ANALYSIS

CROSS-REFERENCE TO RELATED APPLICATIONS

This application is a continuation-in-part of application Ser. No. 12/464,893 titled "METHOD AND SYSTEM FOR USER MONITORING", FILED May 13, 2009, now U.S. Pat. No. 8,086,730, which is incorporated by reference.

BACKGROUND

This invention relates to the field of computer application analysis. In particular, the invention relates to business application monitoring and analysis.

Due diligence in this context is a phase or a process carried out in an outsourcing situation. It may be described as having the objective of developing a greater understanding and validating a client's environment and business processes to be outsourced. This is necessary in order to efficiently assess the effort, manage performance and identify strategic risk for an outsourced partnership.

When taking over the business processes and applications of the outsourced activities, there is a clear need to map, document, analyze and understand those business process and applications.

Similar needs arise as part of business application modernization, in which (legacy) applications of the client are replaced with modern applications. Here, and in particular during what is known as the extraction phase, the operational aspects of the applications, their data model and their usage patterns are all needed in order to support the transition. Again, there is a need to map, document, analyze and understand the applications, the data models, and their usage.

Conventionally, activities like due diligence or the extraction phase are performed by interviewing customer personnel, be they operators of the applications or management, and by carrying out code analysis of the business applications.

Interviews are time consuming and thus also very expensive, and are also incomplete in nature as it is hard to make sure that all aspects of a business process or an application are covered. Code analysis is powerful in some cases but is limited to the static analysis of an application—the way it was designed—while not being able to capture its dynamic aspects—the way it is actually used.

BRIEF SUMMARY

According to a first aspect of the present invention there is provided a method for computer application analysis, comprising: monitoring a computer system on which an application to be analyzed is executed and interacted with by a user of the computer system; capturing screen data of the application as displayed on a display screen of the computer system including interpreting the screen data using optical character recognition (OCR); capturing user inputs to the application to input devices of the computer system; analyzing the captured screen data and user inputs to generate a summary of the usage of the application.

According to a second aspect of the present invention there is provided a computer program product for computer application analysis, the computer program product comprising: a computer readable storage medium having computer readable program code embodied therewith, the computer readable program code comprising: computer readable program code configured to: monitor a computer system on which an application to be analysed is executed and interacted with by a user of the computer system; capture screen data of the application as displayed on a display screen of the computer system including interpreting the screen data using optical character recognition (OCR); capture user inputs to the application to input devices of the computer system; analyze the captured screen data and user inputs to generate a summary of the usage of the application.

According to a third aspect of the present invention there is provided a system for computer application analysis, comprising: a processor; a monitoring component for monitoring a computer system on which an application to be analyzed is executed and interacted with by a user of the computer system; a screen monitor for capturing screen data of the application as displayed on a display screen of the computer system including interpreting the screen data using optical character recognition (OCR); an inputs monitor for capturing user inputs to the application to input devices of the computer system; an analysis component for analyzing the captured screen data and user inputs to a generate summary of the usage of the application.

According to a fourth aspect of the present invention there is provided a method of providing a service to a customer over a network, the service comprising: monitoring a computer system on which an application to be analyzed is executed and interacted with by a user of the computer system; capturing screen data of the application as displayed on a display screen of the computer system including interpreting the screen data using optical character recognition (OCR); capturing user inputs to the application to input devices of the computer system; analyzing the captured screen data and user inputs to generate a summary of the usage of the application.

BRIEF DESCRIPTION OF THE SEVERAL VIEWS OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings in which:

Figure 1:
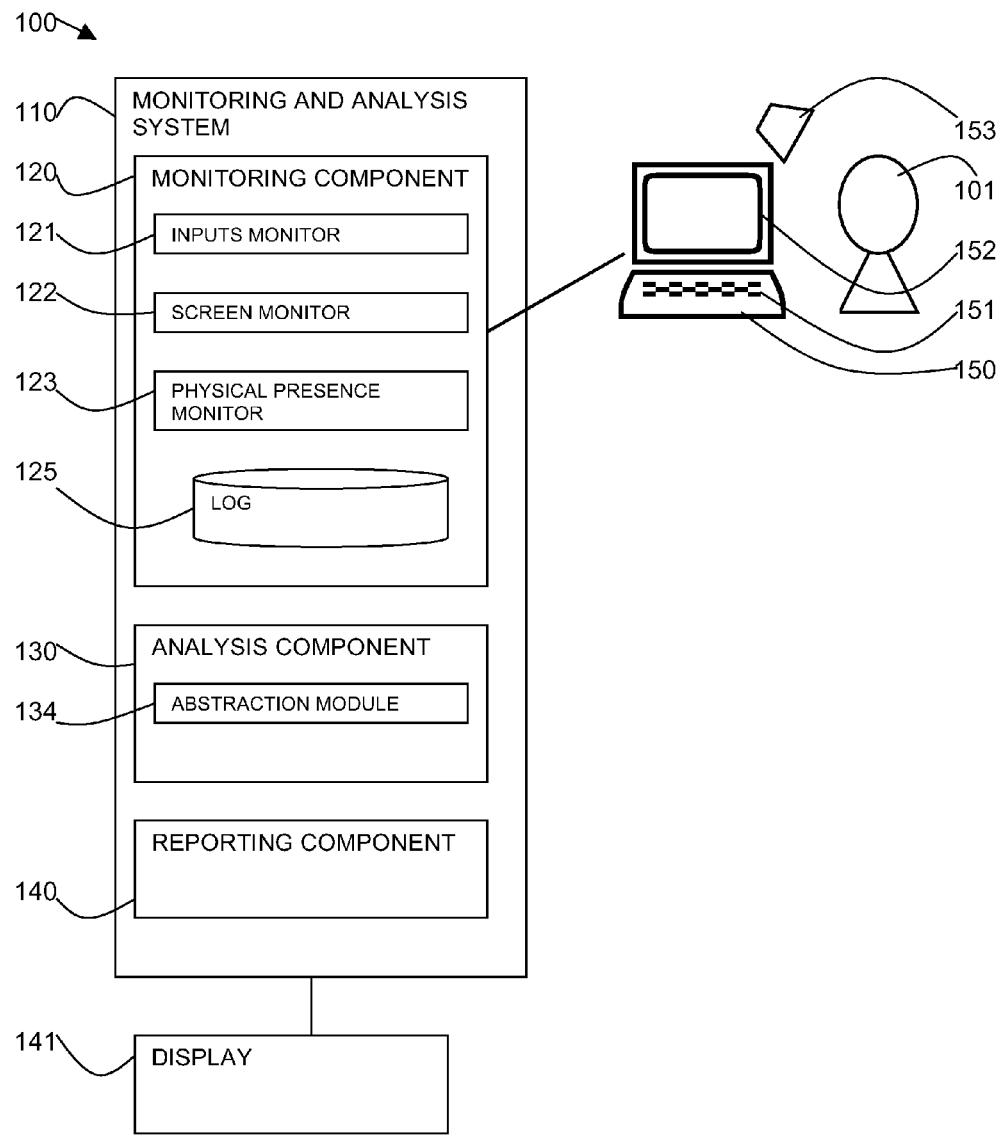
FIG. 1 is a block diagram of an embodiment of a system in accordance with the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

A method, system and computer program product are described in which a computer application is monitored and analyzed. The application is analyzed to track usage, create reports on the screens that are used, and data that is entered including the used fields and range of values, shortcuts and other best-practices of the operators, and more.

One application of the described method is monitoring and analyzing business applications, for example, that are about to be outsourced or modernized and the described process replaces or complements other methods of due diligence, discovery or extraction phase.

Without the need to install anything on or modify the analyzed system, the described method and system provide a summary of the usage of a monitored application. The summary may include static and dynamic summaries of screens viewed, and a semantic model of the application showing relationships between data items or fields. The summary provides a description of the application that is beyond what can be captured through Code Analysis, database examination (if it exists), etc.

Referring to FIG. 1, an environment 100 is shown with a user 101 working at a computer system or workstation 150. A computer system 150 may include input means 151 such as a keyboard, pointer device, touch screen, etc., a screen or monitor 152, and, optionally, a user presence capturing mechanism 153 such as a camera, seat pressure pad, etc.

A monitoring and analysis system 110 may provide a monitoring or data acquisition component 120, an analysis component 130, and a reporting component 140. The system 110 may also include a display 141 for displaying results of the monitoring and analysis.

The monitoring component 120 may include an inputs monitor 121 for monitoring user inputs such as keystrokes, pointer means movement and clicks, touch screen inputs, etc. made to the input means 151 by the user 101.

The monitoring component 120 may also include a screen monitor 122 for monitoring the display on the user's screen 152. For example, the screen monitor may use screen-scraping techniques including OCR (optical character recognition) based screen understanding providing a functional history of information viewed, clicked on and/or keyed-in by the user 101.

The monitoring component 120 may optionally include a physical presence monitor 123 for monitoring whether the user 101 is at the workstation 150 at any given time. The physical presence monitor 123 may use the presence capturing mechanism 153.

A log 125 may maintain a history of the monitored data from the various monitors 121, 122, 123.

The system 110 may include an analysis component 130 including an abstraction module 134 that provides functional interpretation of the user actions as monitored by the monitoring system 120 and stored in the log 125.

Figure 2:
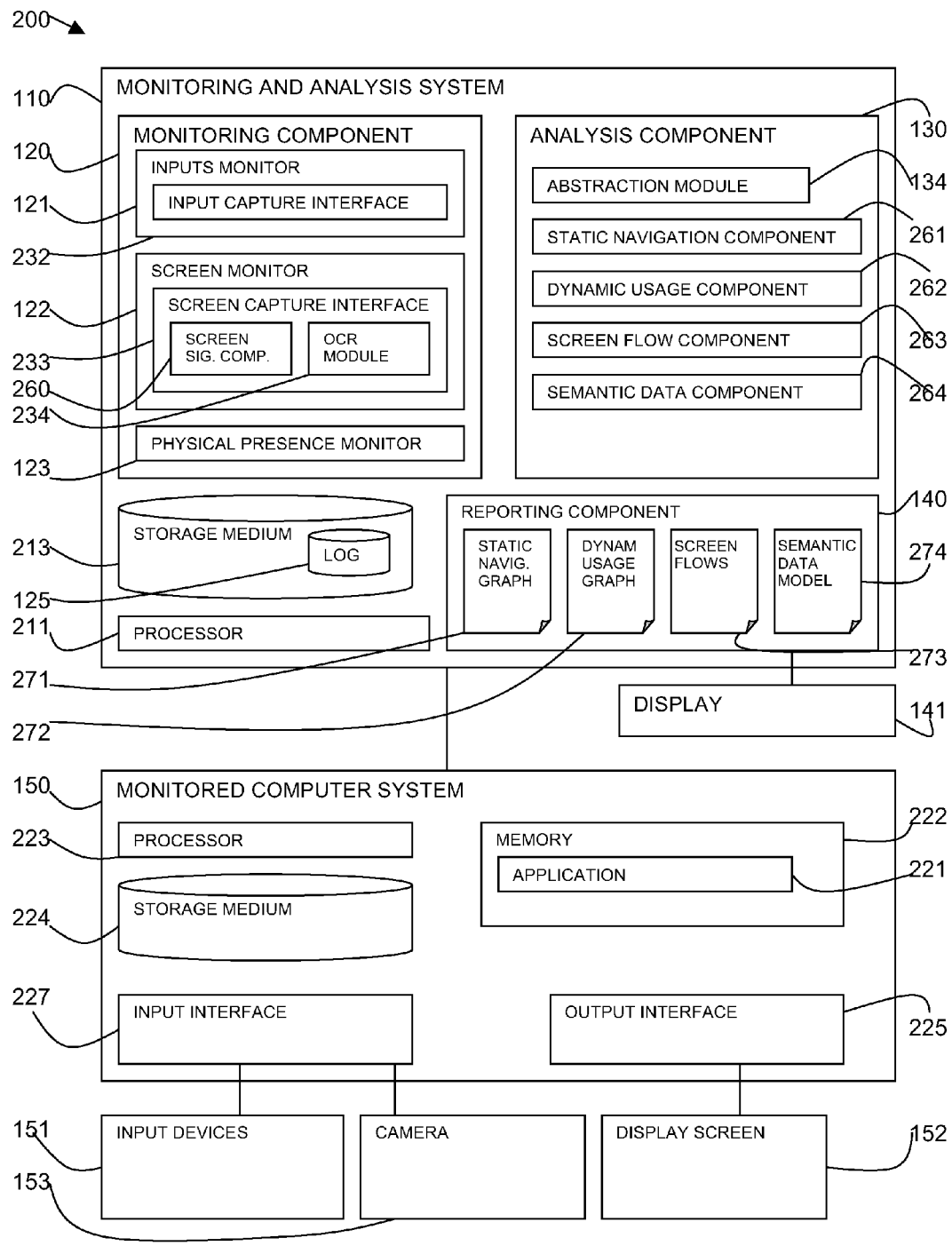
FIG. 2 is a block diagram of the system of FIG. 1 shown in more detail in accordance with the present invention.

Referring to FIG. 2, a more detailed embodiment of the described system 200 is provided. The components shown in FIG. 1 are given the same reference numbers. The described system 200 may include a monitoring and analysis system 110 which may be attached to a computer system 150 to be monitored. The monitoring and analysis system 110 may be attached to the computer system 150 to be monitored physically, for example, via a USB connection as a removable hard-drive, remotely via a network connection, or the functionality of the monitoring and analysis system 110 may be downloaded onto the computer system 150 to be monitored.

The monitored computer system 150 may take the form of any computer system 150 running a computer application 221. The monitored computer system 150 will conventionally include memory 222, in which the application 221 may be stored, a processor 223 for executing software code of the application 221, and storage medium 224. The application 221 may alternatively be stored on a removable storage medium or accessed from a remote server and run on the monitored computer system 150.

The monitored computer system 150 may include an output interface 225 for a display device 152, such as a screen. The monitored computer system 150 may also include an input interface 227 in the form of any suitable communications interface that receives input signals representative of actions performed using input devices 151 such as keyboards, pointer devices, touch pads, etc. Optionally, the monitored computer system 150 may also include a camera 153 or other presence detecting device for indicating the presence of a user at the computer system 150.

The monitoring and analyzing system 110 may include or have access to a processor 211 and storage medium 213. The storage medium 213 may include a log 125 of monitored information. The monitoring and analyzing system 110 may include a monitoring component 120, an analysis component 130, and a reporting component 140. A display 141 may be provided for displaying the output of the reporting component 140.

The monitoring component 120 may include an inputs monitor 121 including an input capture interface 232 for capturing inputs from the input devices 151 to the monitored computer system 150 as received by the input interface 227.

The monitoring component 120 may include a screen monitor 122 including a screen capture interface 233 for capturing data from the output interface 225 for the display device 152 of the monitored computer system 150. The monitoring component 120 may include a screen signature component 260 which is capable of creating a 'signature' of a screen that it captured during the normal operation of the analyzed application 211. Thus, it is able to tell one screen from the other, and recognize a screen in each time it is revisited, even if its dynamic content (e.g., fields) has changed.

The monitoring and analysis system 110 may contain advanced capabilities in OCR-based screen content acquisition (Screen Scraping), screen and layout analysis, operator tracking and monitoring, rich reporting, etc. The screen monitor 122 may also include an optical character recognition module (OCR) 234 for monitoring the text content of screens. Screen scraping techniques include capturing the bitmap data from the screen and running it through an OCR engine, for extracting the text on the screen, and/or in the case of GUI applications, identifying graphical controls such as buttons, text boxes, checkboxes, dropdowns etc., by their visual characteristics.

The monitoring component 120 may also optionally include a physical presence monitor 123 receiving input from a camera 153 of the presence of a user at the monitored computer system 150.

The monitored information gathered from the monitors 121, 122, 123 may be stored in the log 125.

The monitoring and analyzing system 110 may include an analysis component 130. The analysis component 130 may include an abstraction module 134 for receiving the monitored information as collected by the monitoring component 120 and abstracting to functional models.

The analysis component 130 may include a static navigation component 261 for creating a static navigation graph of the application 211. A static navigation graph shows all possible switches between screens that were gathered throughout the monitoring period.

The analysis component 130 may also include a dynamic usage component 262 which determines which screens are connected together and what are the paths between them, what are the more used screens, what are typical screen sequences, etc. A dynamic usage graph may show the actual switches done by an operator. This may be a subset of the static graph or may include extra information such as how many times each switch was done, when, how, etc.

A screen flow component 263 classifies such screen sequences and may allow a human operator to apply names to the flows that represent business processes like 'opening an account'; 'purchase order', 'solving billing dispute-one payment', etc.

Similarly, the analysis component 130 may include a semantic data component 264 for recording which data was entered in which fields in any of the screens, and gradually building a semantic data model of the analyzed business application. A semantic data model does not really tell how data is organized in the database, but it captures its usage and logical grouping, which is in many cases more important.

The monitoring and analysis system 110 may include a reporting component 140 including the reports of a static navigation graph 271, a dynamic usage graph 272 including screen flows or sequences 273, and a semantic data model 274 of the application.

As a result, the suggested system may generate numerous reports that provide the needed information to those that have to decide on the priority and assess the complexity of transforming or operating an application or business process.

Figure 3:
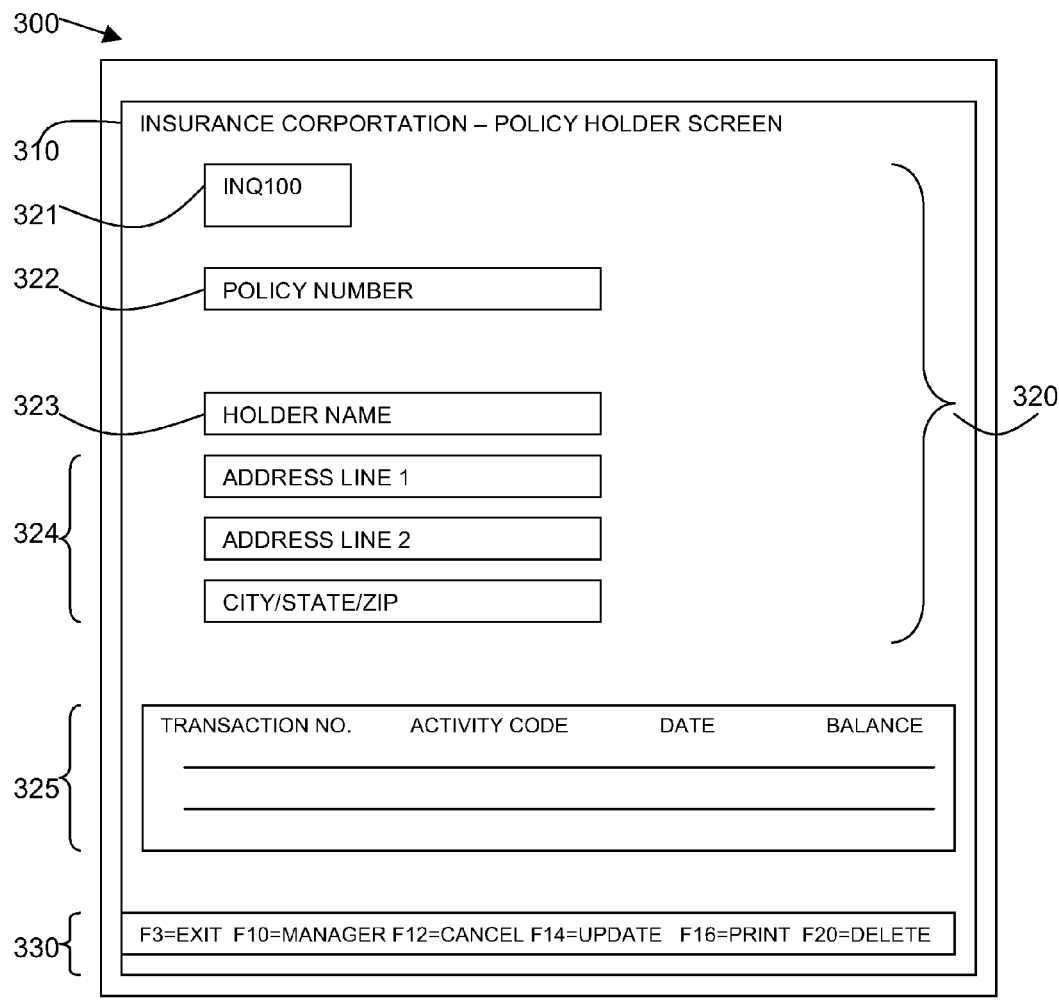
FIG. 3 is a representation of a user interface screen in accordance with an aspect of the present invention.

Referring to FIG. 3, a schematic illustration of an example of a user interface screen 300 is provided, which displays an application's user interface, in accordance with a disclosed embodiment of the invention. A monitored computer system may present a user interface screen image 310 having application data fields 320 on a screen 300. For the purposes of illustration, an image 310 is described using an example of an action performed on a software application to determine policy holder data in association with an insurance policy maintained in a software system. The illustrated screen image 310 comprises a screen label 321, a policy number field 322, a policy holder name field 323 and data fields 324. Additional information 325 may be displayed in the image 310. The user interface screen 300 may have function keys 330 or menus for additional operation commands, such as exit, manager, cancel, update, print, delete, etc.

The monitored computer system is adapted to execute at least one software application. The software application may be responsive to input operations, for example, by signals sent to an input interface. In the present example, the software application provides storage and maintenance functionality for policy holder data for an insurance firm. Typically, the software application generates screen images such as image 310 that are then displayed on a screen 300 in response to the actions. For example, a logon session can involve performing multiple actions in the predetermined order required to enter login and password information.

The software application may require additional input operations that cause monitored computer system to display a different image on screen 300. A monitoring component of a monitoring and analysis system may capture the image from the monitored computer system's screen 300 or from its output interface, using any image capture method known in the art. A capture method may use an image analyzer to recognize information in the screen image including an OCR engine to interpret text in the screen image.

A pseudo code listing of a part of a sample image analysis that may be used in the context of the present example, whereby the software application is running on a mainframe computer, is presented below in Listing 1. Function find_nearest in Listing 1 tries to locate each application data field based upon relative coordinates of the data field, for example, policy number field 322. This is an example of one aspect of screen scraping. Additional or alternative data capture techniques may also be used.

Listing 1

```
image=acquire_screen
OCR.recognize(image)
for (text in set of phrases)
    if (text ends_with ":")    labels.add(text)
    else                       fields.add(text)
end
for (field in fields)
    label=find_nearest(labels,field)
    associate_field(label,field)
end
```

Figure 4:
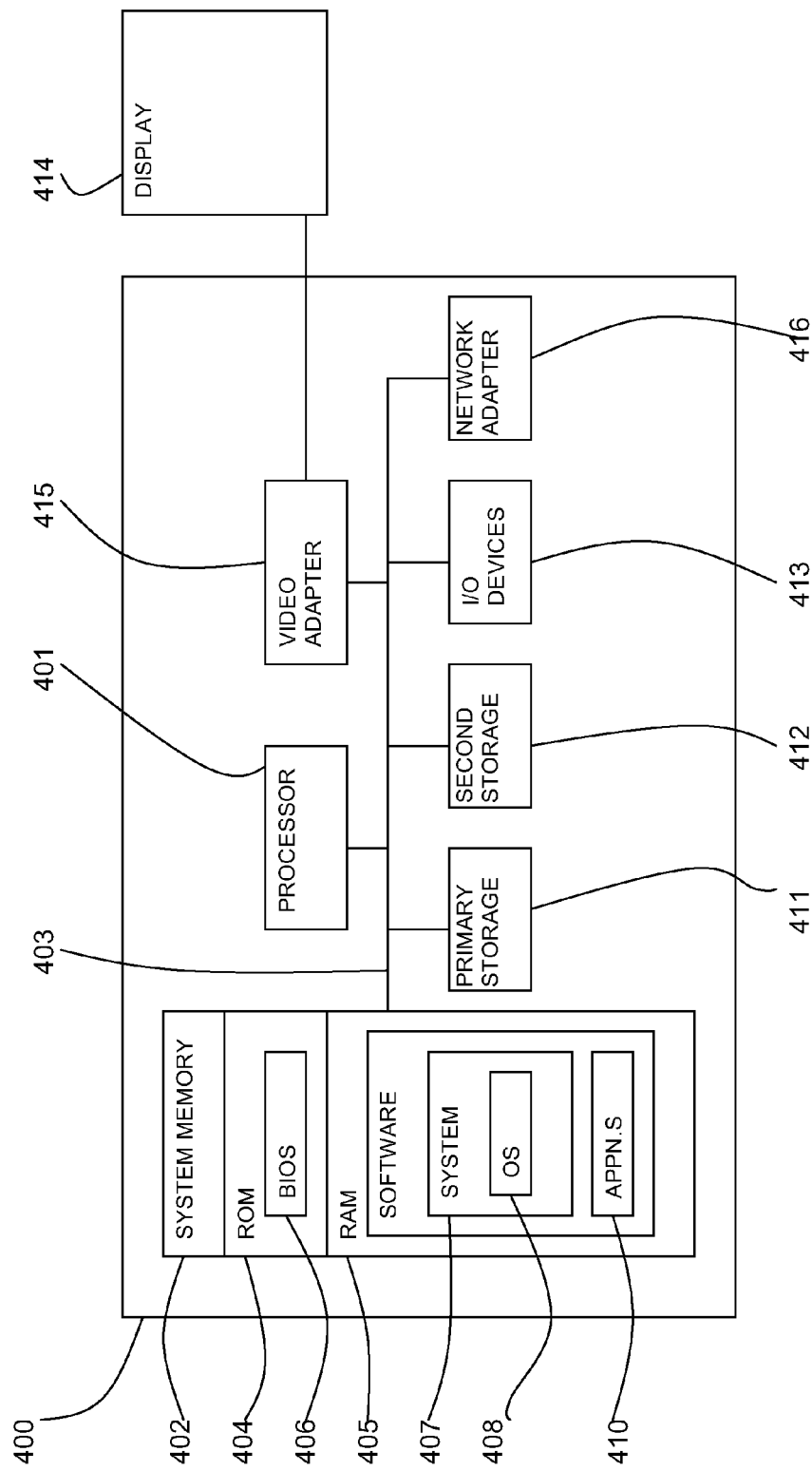
FIG. 4 is a block diagram of a computer system in which the present invention may be implemented.

Referring to FIG. 4, an exemplary system for implementing aspects of the invention includes a data processing system 400 suitable for storing and/or executing program code including at least one processor 401 coupled directly or indirectly to memory elements through a bus system 403. The memory elements can include local memory employed during actual execution of the program code, bulk storage, and cache memories which provide temporary storage of at least some program code in order to reduce the number of times code must be retrieved from bulk storage during execution.

The memory elements may include system memory 402 in the form of read only memory (ROM) 404 and random access memory (RAM) 405. A basic input/output system (BIOS) 406 may be stored in ROM 404. System software 407 may be stored in RAM 405 including operating system software 408. Software applications 410 may also be stored in RAM 405.

The system 400 may also include a primary storage means 411 such as a magnetic hard disk drive and secondary storage means 412 such as a magnetic disc drive and an optical disc drive. The drives and their associated computer-readable media provide non-volatile storage of computer-executable instructions, data structures, program modules and other data for the system 400. Software applications may be stored on the primary and secondary storage means 411, 412 as well as the system memory 402.

The computing system 400 may operate in a networked environment using logical connections to one or more remote computers via a network adapter 416.

Input/output devices 413 can be coupled to the system either directly or through intervening I/O controllers. A user may enter commands and information into the system 400 through input devices such as a keyboard, pointing device, or other input devices (for example, microphone, joy stick, game pad, satellite dish, scanner, or the like). Output devices may include speakers, printers, etc. A display device 414 is also connected to system bus 403 via an interface, such as video adapter 415.

Figure 5:
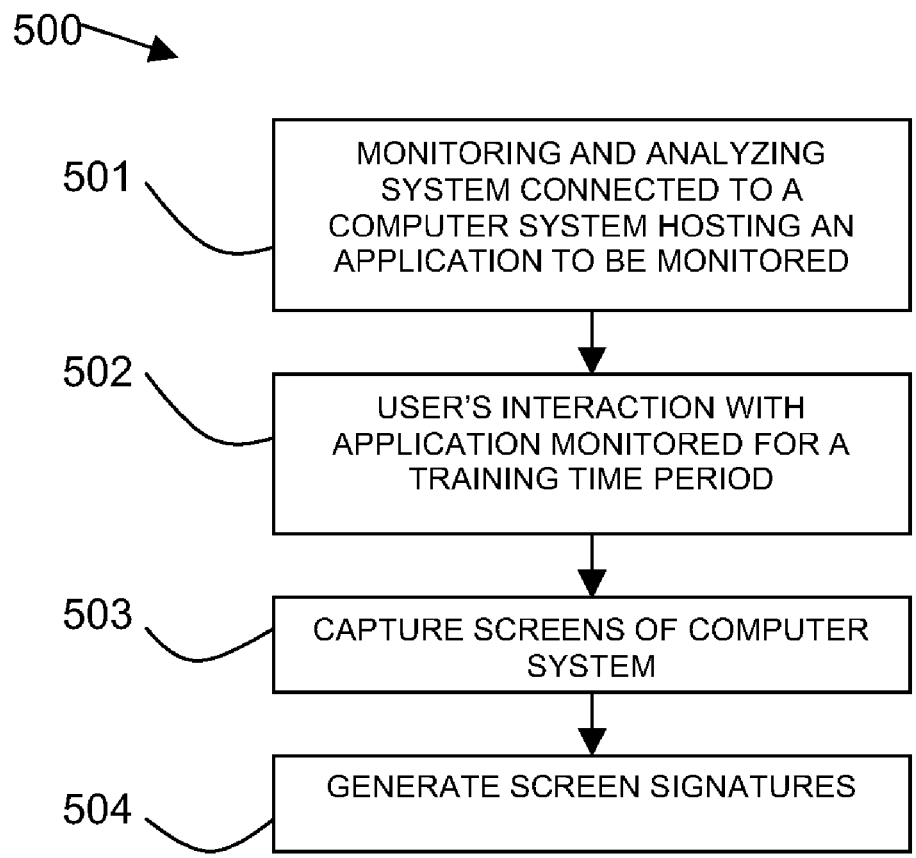
FIG. 5 is a flow diagram of a method in accordance with an aspect of the present invention.

Referring to FIG. 5, a flow diagram 500 shows an embodiment of an aspect of the described method in a training phase. A monitoring and analyzing system is attached or connected to 501 a user's computer system hosting an application to be monitored. The user's interaction with the application is monitored 502 for a training time period, for example, a number of hours, a number of days, a week, a month, etc. Screens may be captured 503 during a training phase and signatures generated 504 for screen instances. A string 'signature' is a unique identification of a screen, and may be created and stored in forms such as strings (e.g. the hash function of all the labels on the screen and their location), bit-arrays (representing pixels in certain locations), numbers (applying CRC (Cyclic Redundancy Check) or similar operations on items on the screens), etc. Each screen instance may be identified by generating a signature of the screen, for example by the values of the text in a few areas in the screen (e.g., the screen title etc.). Thus, in this phase the system is also trained to identify the various screens.

Figure 6:
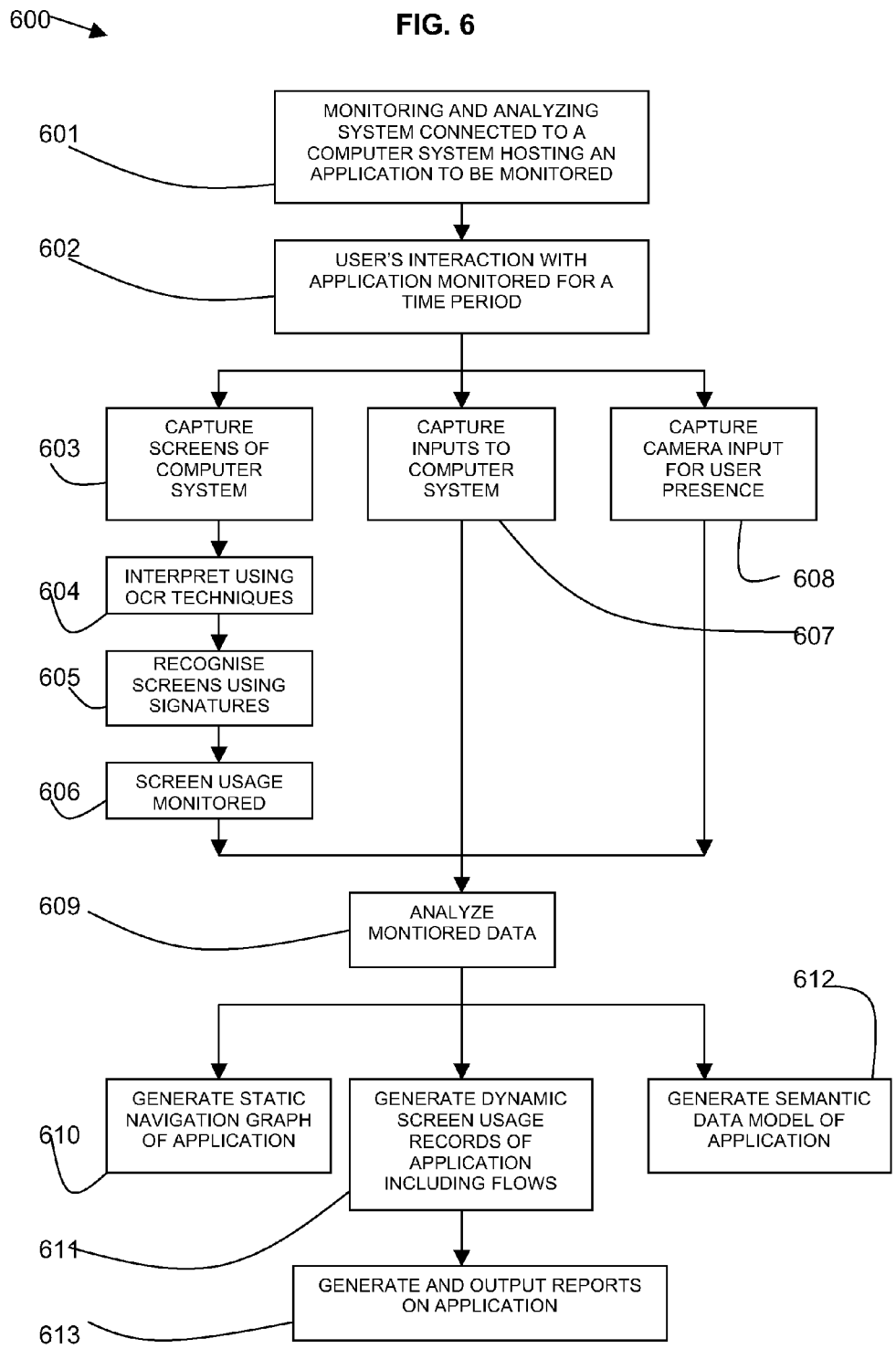
FIG. 6 is a flow diagram of a method in accordance with the present invention.

Referring to FIG. 6, a flow diagram 600 shows an embodiment of the described method. A monitoring and analyzing system is attached or connected to 601 a user's computer system hosting an application to be monitored. The user's interaction with the application is monitored 602 for a time period, for example, a number of hours, a number of days, a week, a month, etc.

The monitoring and analyzing may include all or some of the following steps which may be executed in any order or may be executed simultaneously and repeatedly. The monitoring includes capturing screens 603 of the user's computer system. The captured screens 603 are interpreted 604 using OCR techniques. The captured screens may use the screen signatures generated in the training phase described in FIG. 5 to recognise 605 revisited screens. The described process may recognize repeated screen signatures when they are revisited as a method of generating summaries of the application usage. When accessing a screen its signature may be compared to all the signatures that have been generated (from a training phase) and thus know which is the screen now being accessed. Screen usage may be monitored 606.

Inputs 607 to the user's system are captured and, optionally, a camera input 608 attached to the user's system captures the user's presence. The monitored information (the user presence time) may be stored for analysis.

Analysis 609 is carried out of the monitored data. The analysis may include generating 610 a static navigation graph of the application. An example of the creation of a static navigation graph is described. An application typically has a set of screens connected between them by the various options the application provides to switch from one screen to the other. As an example, an application with screen A which is a menu, that can lead to screens B, C and D, while the application allows to switch from Screen B to screen C by clicking say F1 in screen B, and from screen C to D by clicking F2 when in C. So, the navigation graph describes that relationship—the nodes in the graph are the screens (A, B, C and D) and an edge between a node N1 to node N2 tagged by tag T1 exists if the application allows to switch from screen N1 to screen N2 by clicking T1 in screen N1 (e.g., an edge tagged F2 will be in the example from node C to node D).

The analysis may also include generating 611 dynamic screen usage records including flows or sequences of screens and labelling the flows or sequences. Dynamic usage graphs and heat maps show the hot places visited during operation of the application, for example, a screen which is accessed a lot relative to other screens during the monitoring time, a field which is keyed-in a lot, etc.). Creation and classification of screen sequences or flows track the flow of the user through the application screens, for example, user moved from screen A to B after a given time and after keying in the value X1 in field F1 and X2 in field F2, etc.

The analysis may also include generating 612 one or more semantic data model of data used in the application. A semantic data model or view of an application shows the relations between data items or fields (e.g. First Name and Last Name as being part of a Registration Request) without referring to their actual location and arrangement within the database. A dynamic semantic data model can present which fields, windows and items are used more often than the others, or are accessed together or close in time, the order they are typically addressed, etc.

Reports on the application may be generated and provided 613.

The analysis is based on the log of monitored data including screen dumps, OCR extracted text, the times the operators sat in front of the screen, etc. in order to give a summary of the user's practical use of the application. The text to which the OCR is applied may be text fields, image text, layout, commands, etc.

In an example scenario, users of an application may in practice develop the custom to use a field in a GUI of the application to indicate something different. For example, a male/female input box, which should have an input of 'm' or 'f', may in practice have an indication of 'x' meaning something entirely different as known by the users. Such usage of the application will be captured in the analysis of the screen and inputs of the application.

The described system uses screen interpretation using OCR. Every screen viewed by the user may be analyzed and information content extracted to provide a record. A typical record may say that:

User X1, viewed screen X2, containing fields of Customer Name, Customer Address, Number of the past enquiries etc.

Optionally, the system may also store information contained in each field.

The screen was viewed for X3 seconds.

Optionally, start and end time stamps may be kept as well.

Optionally, all the correlated keystrokes pertaining to the given screen.

The data may be collected on the following aspects:

Screens—the number of times they are called, the average time spent on each, the number of fields in each, the flow between screens in different processes.

Fields—their names, the range of values they can get, the distribution (common vs. rare) of values they actually get, their clusters or groups of similar fields, the cause-effect relations between them.

Flows—typical sequences of screens clustered and labelled, how often they are used, the relation between flows.

Tabular and visual reports may be generated including:

Heat maps (of screens, fields, etc.);

Navigation graphs;

Semantic charts;

Etc.

The described computer application analysis system can contribute to reducing the effort of analyzing legacy systems and business applications, while improving its results in terms of quality and coverage. This is particularly useful in the outsourcing and application modernization markets.

A computer application analysis system may be provided as a service to a customer over a network.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, Ruby, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for computer application analysis, comprising:
monitoring a computer system on which an application to be analyzed is executed and interacted with by a user of the computer system;
capturing screen data of the application as displayed on a display screen of the computer system including interpreting the screen data using optical character recognition (OCR);
capturing user inputs to the application via input devices of the computer system;
analyzing the captured screen data and user inputs in order to recognize the screens presented by the application, to identify revisits to the presented screens, and to generate a summary of the screens presented by the application,
wherein generating the summary includes generating a static navigation graph of the application showing all possible switches between presented screens, identified in the monitoring.

2. The method as claimed in claim 1, wherein analyzing the captured screen data analyzes dynamic usage of screens during use of the application.

3. The method as claimed in claim 1, wherein analyzing the captured screen data classifies sequences of screen instances as user operation flows of the application.

4. The method as claimed in claim 1, wherein analyzing the captured user inputs generates a semantic data model of the application, wherein the semantic data model maps usage and logical grouping of inputs to the application.

5. The method as claimed in claim 1, wherein interpreting the screen data additionally includes recognizing and analyzing non-text content of the captured screen data.

6. The method as claimed in claim 1, including capturing user presence by a physical presence monitor to determine when the user is present at the computer system.

7. The method as claimed in claim 1, including generating signatures of screen instances captured for recognition of the screen instance when revisited.

8. The method of claim 1, wherein analyzing the captured screen data and user inputs to generate a summary comprises generating a summary including indications of relationships between data items of the application.

9. The method of claim 1, wherein analyzing the captured screen data and user inputs to generate a summary comprises identifying dynamic content on the captured screen data and ignoring the identified dynamic data in determining revisits to presented screens.

10. The method of claim 1, wherein analyzing the captured screen data and user inputs to generate a summary comprises collecting statistics on the usage of the presented screens.

11. The method of claim 10, wherein collecting statistics on the usage of the presented screens comprises collecting statistics on usage of transition paths between screens.

12. The method of claim 1, wherein analyzing the captured screen data and user inputs to generate a summary comprises collecting statistics on the usage of fields in the presented screens.

13. The method of claim 1, wherein analyzing the captured screen data and user inputs to generate a summary comprises building a semantic data model indicating which data was entered in which fields.

14. A computer program product for computer application analysis, the computer program product comprising:
a computer readable storage medium having computer readable program code embodied therewith, the computer readable program code comprising:
computer readable program code configured to:
monitor a computer system on which an application to be analyzed is executed and interacted with by a user of the computer system;
capture screen data of the application as displayed on a display screen of the computer system including interpreting the screen data using optical character recognition (OCR);
capture user inputs to the application via input devices of the computer system;
analyze the captured screen data and user inputs to recognize the screens presented by the application, to identify revisits to the presented screens, and to generate a summary of the screens presented by the application,
wherein generating the summary includes generating a static navigation graph of the application showing all possible switches between presented screens, identified in the monitoring.

15. A system for computer application analysis, comprising:
a processor;
a monitoring component for monitoring a computer system on which an application to be analyzed is executed and interacted with by a user of the computer system;
a screen monitor for capturing screen data of the application as displayed on a display screen of the computer system including interpreting the screen data using optical character recognition (OCR);
an inputs monitor for capturing user inputs to the application to input devices of the computer system;
an analysis component for analyzing the captured screen data and user inputs to recognize the screens presented by the application, to identify revisits to the presented screens, and to generate a summary of the screens presented by the application,
wherein generating the summary includes generating a static navigation graph of the application showing all possible switches between presented screens, identified in the monitoring.

16. The system as claimed in claim 15, wherein the analysis component includes:
a screen flow component for analyzing the captured screen data to classify sequences of screen instances as user operation flows of the application.

17. The system as claimed in claim 15, wherein the analysis component includes:
a semantic data component for analyzing the captured input data to generate a semantic data model of the application, wherein the semantic data model maps usage and logical grouping of inputs to the application.

18. The system as claimed in claim 15, wherein the screen monitor for capturing screen data of the application as displayed on a display screen of the computer system includes using optical character recognition (OCR) module to interpret the content of a screen.

19. The system as claimed in claim 15, including a physical presence monitor for capturing user presence to determine when the user is present at the computer system.

20. A method of providing a service to a customer over a network, the service comprising:
- monitoring a computer system on which an application to be analyzed is executed and interacted with by a user of the computer system;
- capturing screen data of the application as displayed on a display screen of the computer system including interpreting the screen data using optical character recognition (OCR);
- capturing user inputs to the application via input devices of the computer system;
- analyzing the captured screen data and user inputs in order to recognize the screens presented by the application, to identify revisits to the presented screens, and to generate a summary of the screens presented by the application,
- wherein generating the summary includes generating a static navigation graph of the application showing all possible switches between presented screens, identified in the monitoring.

* * * * *